No. 760,044. PATENTED MAY 17, 1904.
J. G. WATERSTON & M. SMITH.
SWITCH STAND.
APPLICATION FILED FEB. 25, 1904.
NO MODEL.
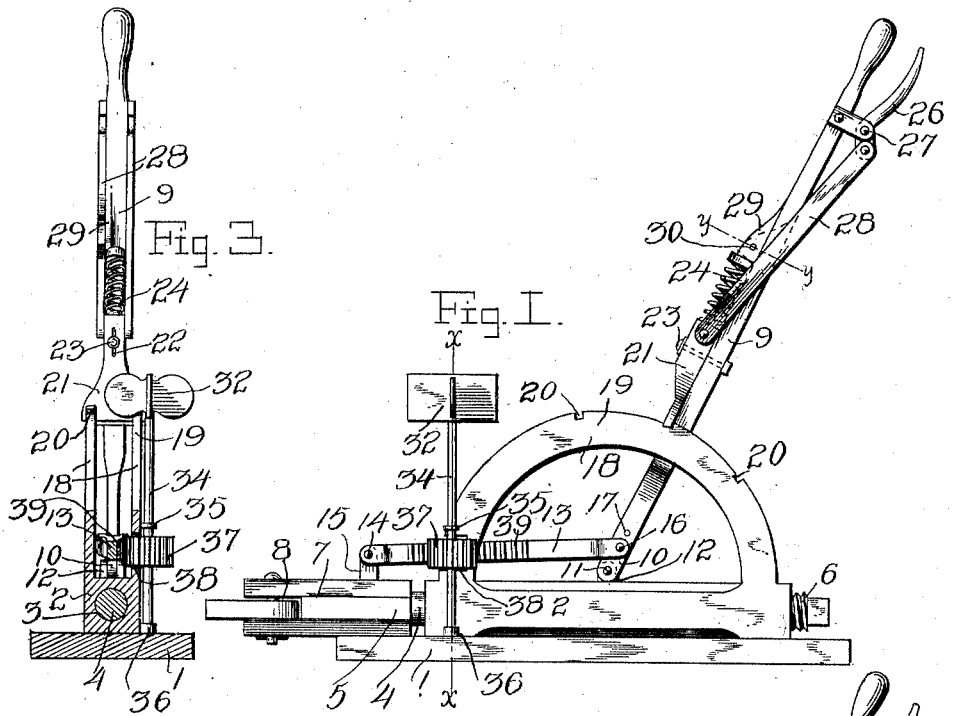
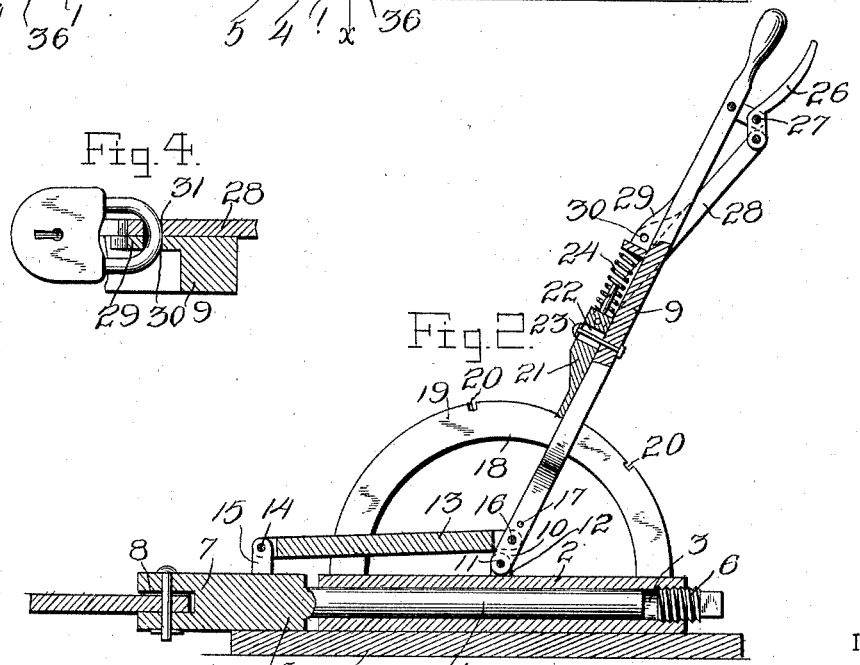
Witnesses
Inventors
J. G. Waterston
M. Smith
By H. B. Willson
Attorney No. 760,044. Patented May 17, 1904.

UNITED STATES PATENT OFFICE.

JAMES G. WATERSTON AND MATT SMITH, OF SCANLON, MINNESOTA.

SWITCH-STAND.

SPECIFICATION forming part of Letters Patent No. 760,044, dated May 17, 1904.

Application filed February 25, 1904. Serial No. 195,270. (No model.)

*To all whom it may concern:*

Be it known that we, JAMES G. WATERSTON and MATT SMITH, citizens of the United States, residing at Scanlon, in the county of Carlton and State of Minnesota, have invented certain new and useful Improvements in Switch-Stands; and we do declare the following to be a full, clear, and exact description of the invention, such as will enable others skilled in the art to which it appertains to make and use the same.

Our invention relates to improvements in railway-switch stands and signal-targets.

The object of our invention is to improve and simplify the construction and operation of devices of this character and to thereby render them more efficient and durable in use and less expensive to manufacture.

With this and other objects in view the invention consists of certain novel features of construction, combination, and arrangement of parts, as will be more fully described, and particularly pointed out in the appended claims.

In the accompanying drawings, Figure 1 is a side elevation of a switch-stand and target-signal constructed in accordance with our invention. Fig. 2 is a vertical longitudinal sectional view through the same. Fig. 3 is a vertical transverse sectional view taken on the line *x x* of Fig. 1. Fig. 4 is a detail transverse sectional view through the operating-lever, taken on the line *y y* of Fig. 1.

Referring to the drawings by numeral, 1 denotes a rectangular metallic base adapted to be secured by spikes or the like to ties, stringers, or any other suitable foundation along the side of a railway-track adjacent to the switch to be operated. Disposed longitudinally upon said base 1 is a guide-casing 2, having a central cylindrical bore or opening 3 extending longitudinally through the same and having the cylindrical portion 4 of a switch-operating bar 5 slidably mounted therein. The said portion 4 of the bar 5 projects into one end of the casing 2, which has its other end closed by a screw-plug 6, and the enlarged portion 7 of said bar 5 has its outer end slotted or bifurcated, as at 8, to permit the link which connects it to the movable switch-rail to be pivotally secured.

The bar 5 is moved longitudinally in order to shift the switch by an operating hand-lever 9, having its lower bifurcated end 10 pivoted by a bolt or pin 11 to a lug 12 upon the upper side of the casing 2. Said lever is connected to the bar 5 by a connecting rod or link 13, one of the bifurcated or forked ends of which is pivoted by a pin 14 to a lug 15 upon the enlarged portion 7 of the bar 5, and the opposite bifurcated end of said rod 13 straddles the lower portion of the lever 9, to which it is adjustably pivoted by a pin 16, adapted to be passed through alining openings in said forked end of said rod and through one of a series of openings 17 formed in said lever. The lever swings in an opening or slot formed in a segmental or arc-shaped rack-frame 18, projecting vertically from the casing 2. The upper edges of the sides 19 of said frame 18 are formed with notches 20, adapted to be engaged by a pawl 21, which holds said bar in an adjusted position. Said pawl is slidably mounted upon the lever by forming the same with a slot 22, through which a bolt 23 upon the lever projects, and said pawl is normally held seated in said notches by a coil-spring 24, confined between projections upon the upper end of said pawl and upon a lug 25 formed on said lever. In order to retract said pawl, a handpiece 26 is pivoted, as at 27, adjacent to the upper end of the lever and connected to said pawl by parallel links 28, disposed on each side of said lever and adapted to assist in guiding said pawl. It will be seen that by operating said handpiece the links 28 will draw upon the pawl and raise it against the tension of the spring 24. In order to lock said pawl against movement, and hence to lock the entire apparatus, a lug 29 is provided upon said lever and is formed with an opening or aperture 30, adapted to register or aline with an opening 31 formed in one of the links 28, so that a padlock or other locking device may be inserted in said openings to lock said parts against movement.

In order to operate the usual target-signal 32, secured upon the upper end of a vertical shaft 34, mounted in bearings 35 and 36 upon said frame 18 and base 1, we secure to said shaft a gear or pinion 37, which projects through a slot or opening 38, formed in one of the sides 19 of the frame 18, and which is in mesh with a rack 39, formed or secured upon the said connecting rod or link 13. It will be seen that when said lever is shifted the movement of the connecting-rod will shift the switch-bar 5, and its rack 39 will at the same time turn the gear 37, which will rotate the shaft 34, and hence operate the target-signal.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. In a switch-stand, the combination of a base having a guide-casing, a switch-operating bar slidably mounted in said casing, an operating-lever pivotally mounted upon said casing, a link connecting said lever and said sliding bar, a segmental rack upon said casing, and a pawl upon said lever adapted to coact with said segmental rack and hold said lever in an adjusted position, substantially as described.

2. In a switch-stand, the combination of a base having a guide-casing, a switch-operating bar slidably mounted in said casing, a pivotally-mounted operating-lever, a link or rod connecting said bar and said lever, a target or signal device, and means upon said link for actuating said target or signal device when said lever is operated, substantially as described.

3. In a switch-stand, the combination of a base having a guide-casing, a switch-operating bar slidably mounted in said casing, a pivotally-mounted operating-lever, a link or rod connecting said bar and said lever, a target-shaft, a gear upon said shaft, and a rack upon said link adapted to actuate said gear when said lever is operated, substantially as described.

4. In a switch-stand, the combination of a base having a guide-casing, a switch-operating bar slidably mounted in said casing, a hand-lever pivoted upon said casing, a link connecting said bar and lever, a segmental rack upon said casing, a spring-actuated pawl upon said lever adapted to coact with said segmental rack, a handpiece upon said lever for retracting said pawl, a vertical target-shaft, a gear upon said shaft, and a rack upon said connecting-link in mesh with said gear, substantially as described.

5. In a switch-stand, the combination of a switch-operating hand-lever having an apertured lug, a pawl upon said lever, a handpiece upon said lever, and links connecting said handpiece and said pawl, one of said links being formed with an aperture adapted to aline with the aperture in said lug whereby a locking device may be inserted in said openings to lock said pawl against movement, substantially as described.

In testimony whereof we have hereunto set our hands in presence of two subscribing witnesses.

JAMES G. WATERSTON.
MATT SMITH.

Witnesses:
   H. E. MOLZAHN,
   H. J. MEHLS.